United States Patent
Rogalla et al.

(10) Patent No.: US 10,577,266 B2
(45) Date of Patent: Mar. 3, 2020

(54) ANAEROBIC PROCESS WITH FILTRATION PROCEDURE FOR TREATING WASTEWATER AT ROOM TEMPERATURE

(71) Applicants: FCC AQUALIA, S.A., Madrid (ES); UNIVERSITAT POLITÈCNICA DE VALÈNCIA, Valencia (ES); UNIVERSITAT DE VALÈNCIA ESTUDI GENERAL, Valencia (ES)

(72) Inventors: Frank Rogalla, Madrid (ES); Jose Ramón Vázquez Padín, Madrid (ES); Emérita Jiménez Douglas, Madrid (ES); Freddy Durán Pinzón, Valencia (ES); Aurora Seco Torrecillas, Valencia (ES); Alberto Bouzas Blanco, Valencia (ES); Josep Ribes Bertomeu, Valencia (ES); María Victoria Ruano García, Valencia (ES); Joaquín Serralta Sevilla, Valencia (ES); Ángel Robles Martínez, Valencia (ES); Juan Bautista Giménez García, Valencia (ES); José Ferrer Polo, Valencia (ES)

(73) Assignees: FCC AQUALIA, S.A., Madrid (ES); UNIVERSITAT POLITÈCNICA DE VALÈNCIA, Valencia (ES); UNIVERSITAT DE VALÈNCIA ESTUDI GENERAL, Valencia (ES)

( * ) Notice: Subject to any disclaimer, the term of this patent is extended or adjusted under 35 U.S.C. 154(b) by 0 days.

(21) Appl. No.: 16/090,341

(22) PCT Filed: Mar. 30, 2017

(86) PCT No.: PCT/EP2017/057526
§ 371 (c)(1),
(2) Date: Oct. 1, 2018

(87) PCT Pub. No.: WO2017/167869
PCT Pub. Date: Oct. 5, 2017

(65) Prior Publication Data
US 2019/0127251 A1    May 2, 2019

(30) Foreign Application Priority Data
Mar. 30, 2016   (EP) .................................. 16382140

(51) Int. Cl.
C02F 3/28     (2006.01)
C02F 3/00     (2006.01)

(52) U.S. Cl.
CPC ............ *C02F 3/2853* (2013.01); *C02F 3/006* (2013.01); *C02F 3/2893* (2013.01); *C02F 2303/16* (2013.01); *Y02E 50/343* (2013.01)

(58) Field of Classification Search
CPC .. C02F 3/2853; C02F 3/2893; C02F 2303/16; Y02E 50/343
USPC ................................ 210/603, 252, 259, 615
See application file for complete search history.

(56) References Cited

U.S. PATENT DOCUMENTS 8,580,113 B2    11/2013  Hong et al.
2010/0248335 A1* 9/2010  Komatsu ................ B01D 61/20
                                                435/262.5

(Continued)

FOREIGN PATENT DOCUMENTS

EP          0 970 922 A2    1/2000
EP          0 970 922 A3    1/2000

(Continued)

OTHER PUBLICATIONS

R.Pretel et al., "The operating cost of an anaerobic membrane bioreactor (AnMBR) treating sulphate-rich urban wastewater", Separation and Purification Technology, 2014, pp. 30-38 vol. 126.

(Continued)

*Primary Examiner* — Fred Prince
(74) *Attorney, Agent, or Firm* — Sughrue Mion, PLLC

(57) ABSTRACT

The present invention refers to an anaerobic process with filtration procedure for wastewater treatment at room temperature, that comprises:

(Continued)

continuously feeding at least one anaerobic reactor, with previously sieved wastewater and feeding biodegradable organic waste—BOW—also previously sieved, said reactor being coupled to at least one gasified filtration membrane, with recirculation of biogas from the reactor, carrying out the anaerobic digestion of the organic fraction contained in the mixture of wastewater and the BOW, in the reactor, obtaining a treated mixture and filtering the mixture treated in the reactor, in at least one filtration tank through the gasified membrane under conditions such that the relationship between the biogas recirculated per square meter of membrane, and time unit, and the wastewater filtered—SGDp—is the minimum value allowed by the solid concentration in a treatment plant.

17 Claims, 3 Drawing Sheets

(56) References Cited

U.S. PATENT DOCUMENTS

| | | | | |
|---|---|---|---|---|
| 2012/0048801 | A1* | 3/2012 | Hong | C02F 3/2853 210/603 |
| 2013/0075328 | A1 | 3/2013 | Ewing | |
| 2014/0124439 | A1 | 5/2014 | Song et al. | |
| 2014/0131272 | A1* | 5/2014 | Josse | B30B 9/12 210/605 |
| 2015/0076059 | A1* | 3/2015 | Theodoulou | C02F 11/125 210/608 |

FOREIGN PATENT DOCUMENTS

| | | |
|---|---|---|
| ES | 2 315 178 A1 | 3/2009 |
| WO | 2013/155631 A1 | 10/2013 |

OTHER PUBLICATIONS

R. Pretel et al., "Designing an AnMBR-based WWTP for energy recovery from urban wastewater: The role of primary settling and anaerobic digestion", Separation and Purification Technology, Sep. 26, 2015, pp. 132-139, vol. 156.

J. Ferrer et al., "Design methodology for submerged anaerobic membrane bioreactors (AnMBR): A case study", Separation and Purification Technology, Dec. 24, 2014, pp. 378-386, vol. 141.

International Search Report for PCT/EP2017/057526 dated Jun. 19, 2017 [PCT/ISA/210].

Written Opinion for PCT/EP2017/057526 dated Jun. 19, 2017 [PCT/ISA/237].

* cited by examiner

ANAEROBIC PROCESS WITH FILTRATION PROCEDURE FOR TREATING WASTEWATER AT ROOM TEMPERATURE

CROSS REFERENCE TO RELATED APPLICATIONS

This application is a National Stage of International Application No. PCT/EP2017/057526 filed Mar. 30, 2017, claiming priority based on European Patent Application No. 16382140.8 filed Mar. 30, 2016.

FIELD OF THE INVENTION

The present invention relates to a process for enhancing the sustainable wastewater treatment at ambient temperature, in an anaerobic process coupled to submerged filtration membranes, using for this purpose the addition of an organic waste with a high degree of biodegradability and modifying the operating parameters of the filtration process for the energy optimization of the plant.

PRIOR ART OF THE INVENTION

Wastewater has its origin in domestic or urban uses, industrial, agricultural and water coming from the rain. For their treatment and reuse exclusively aerobic processes have initially been developed, and in recent years anaerobic treatments have seen an increase.

In the state of the art anaerobic treatment processes are known which comprise the recovery of gases such as methane, hydrogen, carbon dioxide and a recirculation of a part of the biogas to the treatment tank, and filtration of the treated water through membranes, such that the produced sludge that include the microorganisms necessary for the anaerobic treatment, remain inside the plant sufficient time for carrying out the process.

But these processes still suffer from significant drawbacks such as:
- low energy efficiency based on the sulfate content of the influent wastewater, which considerably affects methane production by reducing the amount of organic matter available for archaea,
- the effluent produced, besides displaying methane oversaturation, contains a partially dissolved relevant fraction of this compound, depending on the medium temperature,
- poor performance of the filtration process, which increases the cleaning and maintenance needs of the membranes.
- lack of knowledge of operation strategies and optimum parameters that allow the sustainable operation of the plant,
- problems posed by risk of medium acidification,
- high consumption of chemical reagents used for periodic cleaning of the membranes, what involves additional costs of operation.

Patent ES2315178 discloses a method for treating wastewater in an anaerobic reactor and a plant for carrying it out. With the method and the installation described in ES2315178 an improvement of the chemical and energy efficiency has been achieved as well as a reduction of sludge and gaining process stability. However, taking into account the complexity involved in a method for treating water and the necessary installation itself, there is no indication in the patent of a range of values of the relevant parameters for water treatment, or suggestion leading the expert to the choice of certain values or others. For example, neither is any indication of the amounts of solids that can be present in the reactor or the solid concentration therein for an improved operation, or which is the gas flow that has to cross the membrane to obtain better results, nor is the suitable methodology to control the process described. Therefore the solutions given in this patent still pose problems:
- of performance of membranes, in particular anaerobic sludge filterability,
- in the production and recovery of methane and
- in the process control in order to optimize efficiency and energy viability.

The present invention solves the problems mentioned in this patent
- by controlling the recirculated biogas what improves the performance of the membranes,
- by incorporating BOW thus improving the production and recovery of methane.

With both aspects the energy efficiency of the process is improved.

A patent application of Veolia Water Solutions & Support Technologies US2013075328 is also known, reporting an anaerobic treatment of a waste stream which has anaerobically biodegradable components and wherein biomass and biogas are produced. The mixture occurs in certain parts of the anaerobic reactor, in particular in the lower and upper portions of the reactor, in such a way that relatively heavy solids settle at the bottom and are mixed with the mixed liquor, while relatively light or fine solids float to the top of the reactor wherein they are also mixed with the mixed liquor. The mixed liquor is pumped from an intermediate portion of the anaerobic reactor to a membrane separation unit, wherein it is separated into a permeate stream and rejection stream, which is concentrated into solids. This patent does not specifically address the optimization of the membrane filtration process based on the key operational parameters and characteristics of the waste stream to be treated, thereby compromising the energy viability of the process. Similarly, the use of cross-flow type membranes, which requires to drive the mixed liquor in a multistage filtration process, is specified, also requiring a heat exchanger to increase the temperature of the stream to be treated. Furthermore, it does not address the specific treatment of wastewater stream.

US8580113 patent by Zenon, discloses a method for internal use of the biogas produced in an anaerobic membrane bioreactor which treats wastewater, in order to reduce fouling of the filtration module used. In this invention, the biogas accumulated generates an overpressure inside the reactor of at least 10 Kpa, that is used for filtration of the final effluent. This strategy neither takes into account the range of concentrations of solids in the reactor and membrane chamber nor the recirculation flow rate of this mixed liquor when working with an outer membrane chamber.

EP0970922 Patent by Kubota discloses a method for processing organic waste with high-concentration, such as sludge from septic tanks, farm waste sludge and food waste. However, as in US2013075328 it does not address a specific and sustainable treatment for a liquid phase wastewater stream as in the present invention. Neither suggestions are given in this patent on operating conditions leading to the results achieved with the present invention, nor the system control method thereof, or the recovery of dissolved methane in the final effluent.

Other more recent documents related to the membrane anaerobic treatment of wastewater are for example US2014124439, which merely reflects the current state of the art.

Several studies are found in the state of the art about co-digestion of food waste with sewage sludge (Lacovidou, 2012), with other organic waste (Nano, 2009), with pig manure and other waste from livestock (Zhang, 2011).

The work developed by Kujawa-Roeleveld et al., (2003) is the only precedent of a treatment of a waste water stream with biodegradable organic waste, although in this case tests of batch co-anaerobic digestion are described, without an associated installation that allows continuous processing and optimization of the biological process by using filtration membranes.

The present invention solves the above problems by controlling the dosage of biodegradable organic waste in the anaerobic treatment line, enhancing energy valorization from the organic matter contained in the wastewater, and further optimization of the filtration process through the gasified membrane with partial recirculation of the biogas generated for the energy optimization of the process. This strategy permits the treatment of low load wastewater such as, for example urban wastewater, without an increasing in the sludge production during the process (see FIG. 1A, FIG. 1B and FIG. 1C), due to the fact that the BOW includes solids with a high biodegradability, which enhances the methane production compared to other processes as the sulfate reduction. The production of methane enriched biogas can be increased up to 200% with regard to the anaerobic treatment of the low load wastewater, being theoretically possible to increase this amount.

The sustainability of the filtration process is ensured by specific instructions to operate in a range of sustainable parameters. The main control parameter is the need of recirculated gas by permeate volume, $SGQ_p$, defined below, since it simultaneously considers the gas flow used to maintain the filtration membranes, the production of treated effluent and the fouling rate of said membranes. The operation with minimized $SGD_p$ values must be carried out taking into account the constraints of the plant during its operation, controlled by the solid concentration in the filtration chamber and the biological performance of the anaerobic process.

An adaptation of the control system referenced in the process of the present invention allows dynamically setting the parameters depending on the rate of membrane fouling, minimizing the $SGD_p$ value in real time without interrupting the operation of the anaerobic reactor.

Therefore, it has not been disclosed or suggested the enhancement of the treatment at room temperature of a wastewater stream, such as an urban wastewater stream (UWW) in an anaerobic process coupled to membranes by controlling the amount of biodegradable organics waste (BOW) dosed, and the control of the filtration process parameters, as described herein. The synergy between the two processes described in the present patent (anaerobic wastewater treatment, preferably urban one/addition of biodegradable organic waste (BOW) and membrane filtration), allows to increase the production of biogas and its methane content, with little increase in biosolids production inside the anaerobic reactor (see FIG. 1A, FIG. 1B and FIG. 1C) and under the optimum energy conditions, obtaining a final effluent with an adequate standard of quality for discharge or reuse.

DETAILED DESCRIPTION OF THE INVENTION

In order to make the understanding of the invention easier a list referred to the used terminology and acronyms is provided:

Definitions Used in this Specification:
  "organic solid waste", "biodegradable solid waste" and "solid waste" are interchangeably used.
  "filtered water", "permeate", "efluent", "final effluent" and "filtered effluent" are used interchangeably.
  "cleaning gas" and "biogas" are used interchangeably.
  "plant" and "installation" are used interchangeably.
  "filtration module," "membrane module" and "membrane" refer interchangeably to the filtration element.
  "organic loading rate" and "volumetric organic load" are used interchangeably
  AnMBR: anaerobic membrane bioreactor.
  $SGD_p$: specific gas demand ("specific gas demand") is the relationship between the gas flow rate applied per square meter of membrane and flow of filtered water per square meter of membrane.
  TSS: total suspended solids.
  VSS: volatile suspended solids
  NVSS: nonvolatile suspended solids.
  $TSML_{ar}$: total solids in the mixed liquor of anaerobic reactor.
  SRT: sludge retention time (days).
  COD: Chemical oxygen demand.
  BOW: biodegradable organic waste—they can be solid or not
  KW: kitchen waste.
  OSW: organic solid waste, they are a particular type of BOW
  UWW: urban wastewater.
  OLR: organic loading rate.

The present invention relates to a method for enhancing and controlling the treatment of wastewater sustainable at room temperature.

The anaerobic process with filtration procedure for wastewater treatment at room temperature, of the invention comprises:

continuously feeding at least one anaerobic reactor, with previously sieved wastewater and feeding biodegradable organic waste—BOW—also previously sieved, said reactor being coupled to at least one gasified filtration membrane, with recirculation of biogas from the reactor, carrying out the anaerobic digestion of the organic fraction contained in the mixture of wastewater and the BOW, in the reactor, obtaining a treated mixture and filtering the mixture treated in the reactor, in at least one filtration tank through the gasified membrane under conditions such that the relationship between the biogas recirculated per square meter of membrane, and time unit, and the wastewater filtered SGDp—is the minimum value allowed by the solid concentration in the system, or the treatment plant.

The ratio of applied gas, or cleaning gas, per square meter of membrane and time unit, and the filtered wastewater, is what defines the $SGD_p$ parameter, and it is the parameter that controls the relationship between the gas flow used for maintaining the membrane and the amount of water filtered through the membrane, during the process.

Figure 1A:
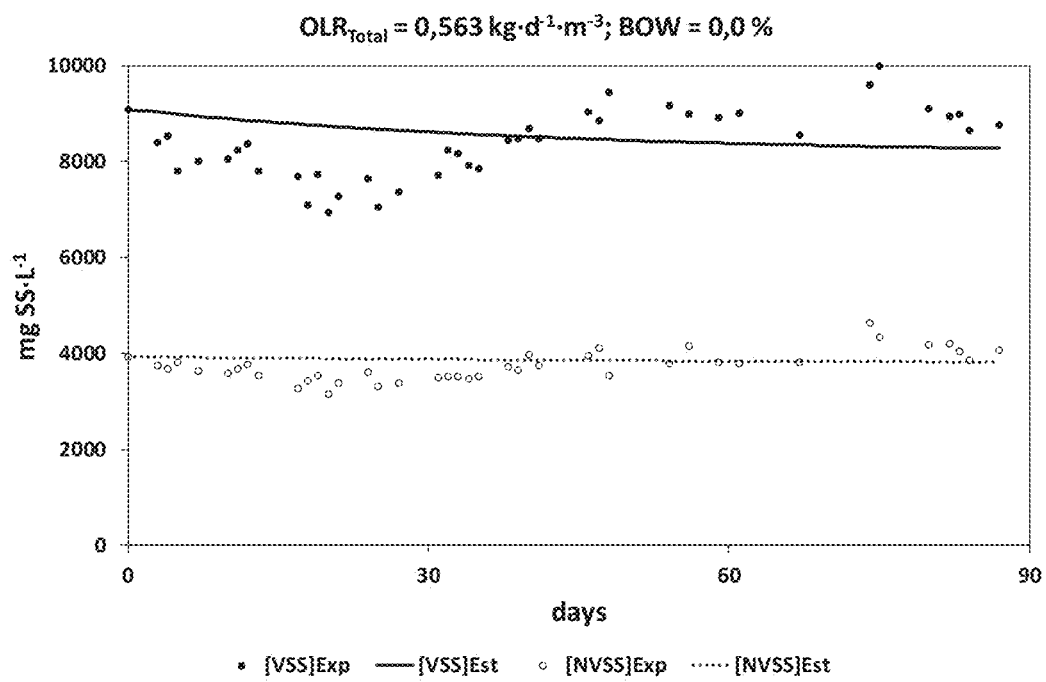
FIGS. 1A-1C: Evolution of the concentration of suspended solids (volatile and non-volatile) in the anaerobic reactor in each of the studied periods. For each of the studied periods, the established amount of BOW was introduced in the plant and the evolution of solids inside the reactor was analytically determined, until stabilization of these was observed. In addition to the analytical values, in the figure one can see the theoretical adjustment done.
Figure 1B:
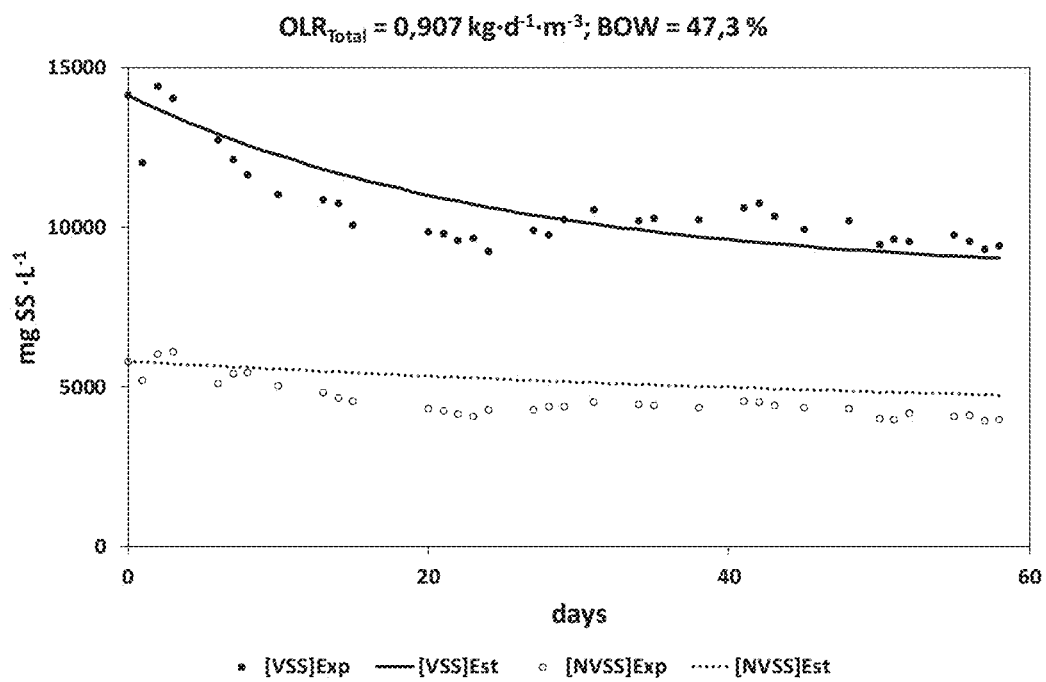
Figure 1C:
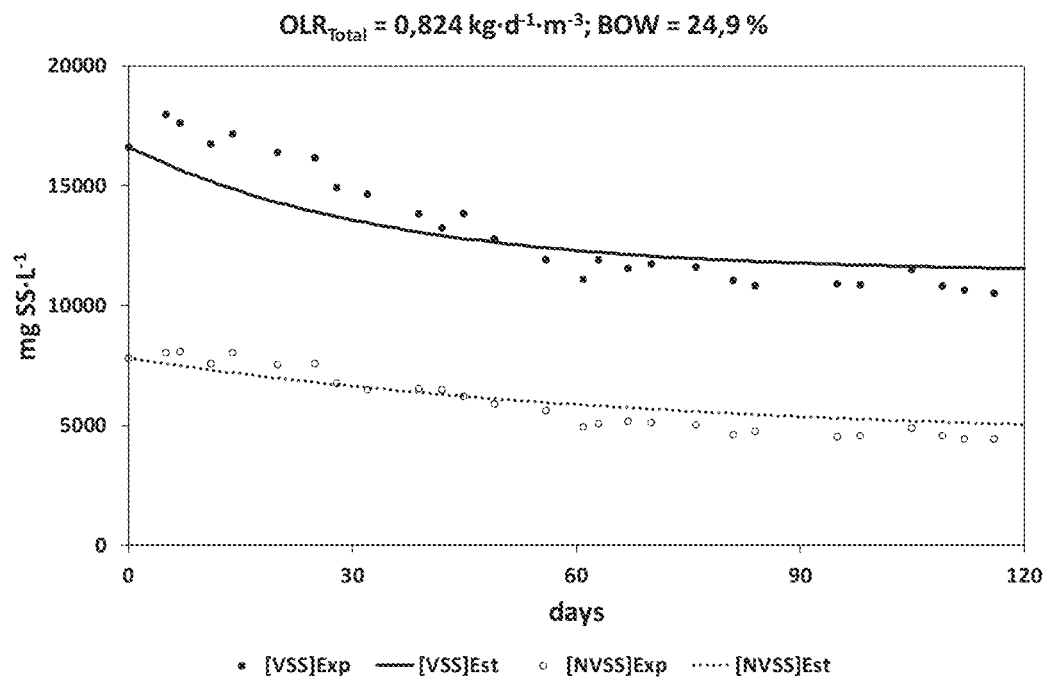
Figure 2:
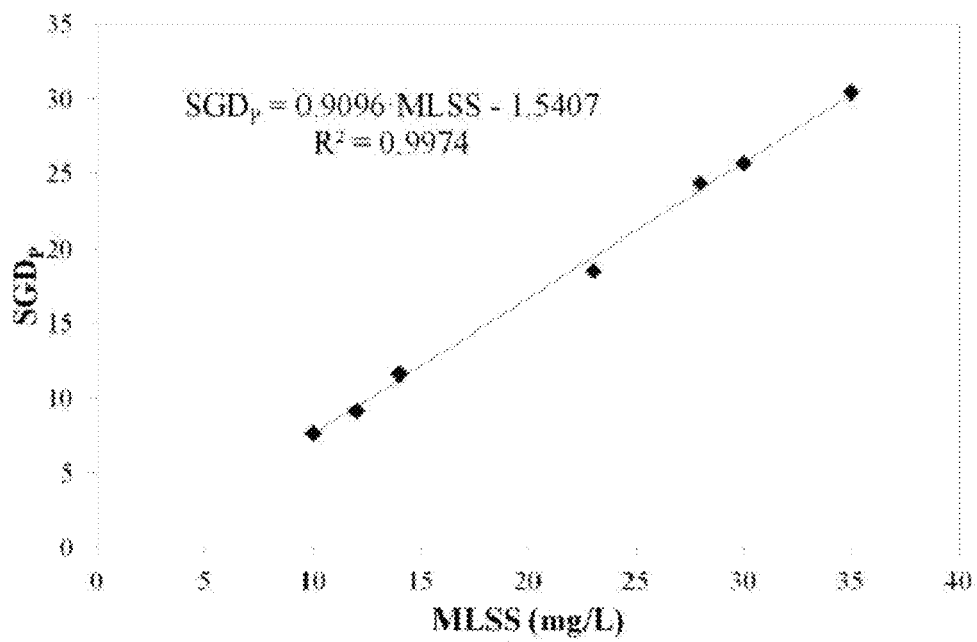
FIG. 2: minimum SGDp value that is defined by the solid concentration in the plant. Starting with the values of solids in the reactor, it is possible to establish the permeate flows and the specific gas demand which allow to minimize the operation cost of the plant (energy consumed, useful life of the membranes, cost of reagents for the chemical cleaning). Said optimum operating parameters are determined by the relationship shown in FIG. 2. This ratio is specific for each filtration system. This relationship allows to operate the plant in the most optimal conditions for each concentration of solids.

The $SGD_p$ parameter must have a sustainable minimum value, which is the minimum value allowed by the solid concentration in the plant. The solid concentration is defined by the suspended solids of the plant, TSS. According to particular embodiments "sustainable" means, for example, that if the concentration of solids, TSS, is 9 g/l, the SGDp minimum value is 6.7 $m^3_{(gas)}/m^3_{(permeate)}$, while for a solid concentration of 25 g/l the SGDp value will be 21.2 $m^3_{(gas)}$ $m^3_{(permeate)}$, (see for example FIG. 2).

The optimal way of operating the membrane module is controlling the ratio between the flow of biogas recirculated for cleaning the membranes and the flow of permeate obtained in the filtration, and the fouling rate in each operational cycle of the membrane used.

Figure 3:
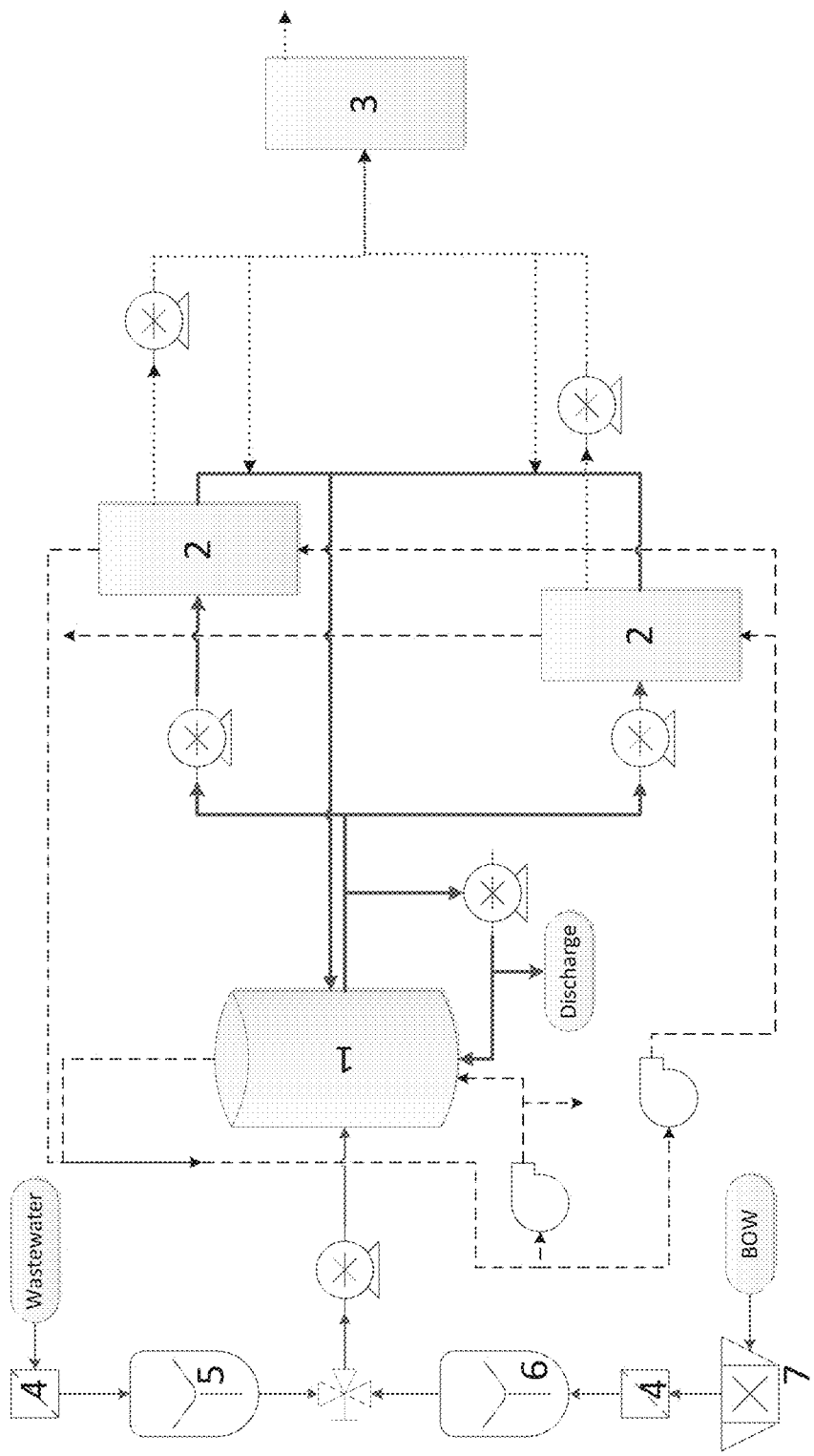
FIG. 3: Diagram of the treatment plant used for the experimental development described in the present patent application. The plant consists of an anaerobic reactor connected to two membrane modules. The power system consists of two homogenization tanks (one for wastewater and another one for BOW) connected to a 3-way valve that alternates the input of these tanks to the plant.

The optimal value of $SGD_p$ is the possible minimum value that can be kept constant in a sustainable manner during the process (the operation of the installation) (FIG. 3), established on the basis of the critical value, which is experimentally determined for each configuration of the plant, or installation, and type of membrane (considering that the present invention is based on membranes that require a gas stream for their maintenance and cleaning. The $SGD_p$ optimal value is one that allows that the variation of pressure inside and outside the membrane (d(P)/dt) does not exceed a value of 0.05 bar·min$^{-1}$ over two consecutive cycles of filtration.

The solid concentration in the mixed liquor inside the anaerobic reactor ($TSML_{ar}$) may be between 1 and 35 g/L, preferably between 9 and 25 g/L.

This biodegradable organic waste, BOW, are previously ground and sieved to a particle size of the order of millimeters, for example less than 2 mm and preferably smaller than 0.5 mm.

According to preferred embodiments, both the wastewater and the BOW are introduced into the reactor, or reactors, upon pretreatment with sieve (the mesh size can be variable, although the preferred one is 0.5 mm) driven both by a pump (for example helical, centrifuge etc) suitably dimensioned according to installation features, from a previous equalization tank.

According to preferred embodiments, in order to regulate the total reactor input (of both, water and BOW), the control system sets the on/off of the supply pump depending on the level/pressure in the anaerobic reactor, aimed at maintaining one inlet flow (of both, water and BOW) similar to the permeate flow.

The BOW ground and sieved can be fed to the anaerobic reactor or reactors, for example, from an attached fermenter or from other facilities.

The OLR of BOW is higher than the OLR of the wastewater, and at most it will be 200% with respect to the OLR of the wastewater fed to the reactor (or reactors) in order to avoid a plant overloading and an acidification of the process due to the excess of volatile fatty acids.

Biodegradable organic waste, BOW, may be urban waste, for example domestic organic waste such as food scraps, but is not necessarily urban waste. Substrates of industries close to the plant, sludge waste from agrifood industries, glycerol, methanol or the like could also be used.

Preferably the BOW used must present a capability of biomethanization of the organic matter contents greater than 60% with respect to the total COD of the residues in order to be interesting in the process of the methane production enhancement.

Regarding the maintenance of pH in the reactor it can be said that, in the preferred case, given the low load of the wastewater stream to be treated, and the high biodegradability of the biodegradable organic waste included, it is unlikely that medium acidification is produced as a consequence of an organic overload. In any case, online dosing "emergency" systems can be implemented on the basis of the occasional addition of alkalinity, although their implementation is conventional and they involve a cost.

The filtration membrane or membranes are submerged and located in at least a second tank or chamber coupled to the reactor or reactors.

As membranes several commercially available options can be used, but for the present invention process they have to be membranes which apply a biogas stream for their maintenance and cleaning. As an example, submerged polymeric membranes can be used, using pore size in the ultrafiltration range. In any case, in the process described in the present invention, membranes combined with other filtration means can be used.

According to additional particular embodiments of the process, the filtration stage of the water treated in the reactor or reactors comprises four steps: filtration, relaxation, counterwashing and ventilation. In a preferred manner, the counterwashing and ventilation steps occupy a daily average time which is at most 2% of the total time of daily operation of the plant.

In the filtration step of the treated mixture, the following is obtained in the reactor:

a stream of filtered water, called permeate, which passes to a degassing and methane recovery system, a rejection mixed liquor stream that is recirculated to the reactor at a rate equivalent to 1-6 times the total flow of the two inputs, but preferably less than 4 times, a biogas stream enriched with methane which is driven to a conditioning system, before its storage.

The biogas stream enriched in methane is capable of being energetically valued in a cogeneration system.

According to particular additional embodiments of the process of the present invention, a solid recirculation is carried out between the filtration chamber or filtration tank and the reactor. The ratio of recirculation flow to rejection mixed liquor, between the filtration chamber or filtration tank and the reactor, is preferably less than 4 times the feeding flow, and with a maximum range of 1-6 times the feeding flow.

The wastewater treated comprises a gas phase methane fraction that can be recovered and returned to the reactor via a cone or degassing membrane. In particular methane recovery is important, since because the reactor is not heated, a high percentage of methane can be dissolved in the water. The treated wastewater therefore comprises a methane dissolved fraction that can be recovered by a degassing membrane.

The wastewater can be any type of wastewater, both urban and industrial one although it is preferably urban water since the present invention solves problems especially associated with the treatment of such streams characterized by low organic load.

According to particular embodiments of the method, the biogas obtained is recirculated by a blower through diffusers located at the bottom of the filtration modules to generate bubbles to prevent fouling formation on their surface. The biogas surplus fraction is directed to a conditioning system before its storage in a gasometer.

The process further comprises performing a solid purge. Purging has to be performed with a purge average frequency defined by the concentration of solids to be set in the anaerobic reactor.

According to particular embodiments of the process, the sludge produced and remnants are removed by a purge valve that can be of manual or automatic activation.

The excess of sludge that is purged from the plant can be directly included into the sludge line of the plant wherein the process takes place for its stabilization (if necessary) and subsequent energy recovery.

If necessary depending on the permeability conditions, an external washing of the membrane by physicochemical means is carried out. By such washing a sustainable $SGD_p$ value within 90-100% of the initial value, can be recovered in the plant.

As for biological nutrient removal, this is not necessary when the effluent can be reused directly in irrigation applications (growing areas or golf courses present in the area). Otherwise, the final effluent, having $N-NH_4$ average values of around 40-80 mg/L, would require a biological post-treatment designed for removal of nutrients. This post-treatment can be, for example, as the one described in ES2315178, in order to obtain a suitable quality for discharge.

The process of cleaning, repairing and/or replacement of membranes will be described by the supplier of the membranes used in the process.

According to a preferred embodiment of the invention, the process comprises at least the steps of:

continuously feeding at least one anaerobic reactor, with previously sieved wastewater feeding BOW previously ground and sieved, to the anaerobic reactor, with a maximum loading rate of BOW of 200% with respect to the wastewater loading rate, being said reactor coupled to at least a gasified filtration membrane with biogas recirculation from the reactor, having the reactor a solid concentration, $TSML_{ar}$, comprised between 1 and 35 g/L, preferably comprised between 9 and 25 g/L, carrying out the anaerobic digestion of the organic fraction contained in the mixture of wastewater and the BOW, in the reactor, obtaining a treated mixture and filtering the mixture treated in the reactor, in at least one filtration tank through the gasified membrane under conditions such that the relationship between the biogas recirculated per square meter of membrane, and time unit, and the wastewater filtered SGDp—is the minimum value allowed by the solid concentration in the plant, and even more preferably SGDp has a value such that the variation of pressure inside and outside the membrane (d(P)/dt) does not exceed a value of 0.05 bar·min$^{-1}$ over two consecutive filtration cycles, and such that the solid recirculation ratio between the reactor and the chamber that comprises the membrane with regard to the reactor feeding flow is 1-6, preferably less than 4.

The invention process is automatically controlled in the following way: working and operating parameters are continuously measured and controlled (flows, pH, redox potential, biogas production, turbidity, TMP, transmembrane flow, solids and other parameters) and the anaerobic reactor performance, and in such a way that indications are available for the necessary modifications to be done in order to solve problems to achieve the optimal performance. In other words, the continuous following produces a feedback instruction for modifications of relevant parameters (flow rate of biodegradable organic waste to be introduced, permeate flow, biogas recirculation flow to the membrane, . . . ) to improve the effectiveness of the process. A control system or program that can be applied to the process and installation of the present invention is known from publications:

A. Robles, M. V. Ruano, J. and J. Ferrer Ribes. *Advanced control system for optimal filtration in anaerobic submerged* MBRs (SAnMBRs). Journal of Membrane Science (2013) 430, 330-341.

Therefore, by controlling the process in the manner indicated it is achieved that it is always carried out in optimal operating conditions. And corrective operations are envisaged if the parameters do not have the appropriate values. For example, when it holds that $d(P)/dt>0.05$ bar$^{-1}$ min$^{-1}$, three corrective measures to be implemented in the order of priority indicated below are established:

1. The plant will operate with a higher $SGD_p$ value, what is achieved by decreasing the treatment flow rate and/or increasing the cleaning gas flow until the recovery of the sustainable operation.
2. When working within the $SGD_p$ required range is not possible, the active anaerobic biomass concentration in the filtration chamber will be decreased by modifying the solid recirculation ratio or carrying out a solid purge.
3. A physical cleaning process of the membrane will be carried out.

The main parameters in the process of the invention that determine how to carry out the various operations are:

the organic loading rate coming from the biodegradable organic waste is established to a maximum of 200% with respect to the wastewater loading rate, the methane biochemical potential of the organic waste corresponds to biomethanization potentials above 60% with respect to the total COD of the residues, the capacity of the membrane is maximized by lowering the $SGD_p$ value (m$^3$ recirculated gas·h$^{-1}$·m$^2$/m$^3$ permeate·h$^{-1}$·m$^2$), taking as a condition that the adopted value be sustainable with time, the sustainability condition consists in that d(P)/dt does not exceed 0.05 bar$^{-1}$ min$^{-1}$ over two consecutive cycles of filtration, the total solid concentration in the reactor, $TSML_{ar}$, is between 1 and 35 g/L, preferably 9 to 25 g/L.

The process of treating wastewater according to the invention has the following advantages:

enhancement of microbial activity using biodegradable organic waste (BOW), which can be from domestic sources, which are added from a tank adjacent to the anaerobic reactor. This system solves problems arising from the presence of dissolved sulfate in wastewater with low organic load, and enhances the energy viability, substantially increasing the organic load available to microorganisms of the archaea type, what increases the apparent hydrolysis constant ($K_{H,Ap}$) of the process and the methanogenic activity, despite the addition biodegradable organic waste, the amount of biosolids produced during the process (expressed as kg VSS·kg $COD^{-1}$ removed) is much lower than in the case of treating only wastewater, observing an increase in the apparent hydrolysis constant, the filtration process control permits that the economic viabilty of the process be increased since chemical washing processes of the used membrane are not required, what involves savings in the consumption of chemical reagents.

The process of the present invention achieves:

i) the enhancement of the energy performance ii) and the control in a sustainable manner of the wastewater treatment and simultaneous production of energy in the form of biogas through the transformation of organic matter present in the water, being the process enhanced by the addition of biodegradable organic waste.

The present invention is an interesting and advantageous technology in cases that:

it is necessary to improve the anaerobic treatment at room temperature with a filtration system, for wastewater with low organic load, it is necessary to improve or maintain the biogas production in the anaerobic treatment at room temperature with a filtration system for wastewater with variable organic load, it is necessary to increase the biogas production in an anaerobic treatment at room temperature with a filtration system, for wastewater.

The joint biomethanization of the two substrate types, this is the BOW and the organic substrate that can be present is an advantageous alternative from the energy point of view, taking advantage of the synergy of mixtures and compensating for the shortcomings of each of the substrates separately.

Thus, the process combines a step of anaerobic biological treatment with a filtration step.

The two main advantages of the present invention are: stable operation in a dynamic range of adaptable operational parameters, depending on the state of the process and enhancing energy efficiency by co-treatment of wastewater and biodegradable solid waste.

EXAMPLES

In a particular embodiment of the invention a treatment of urban wastewater is carried out following the described process and adding biodegradable organic waste to the line of anaerobic treatment, which can be kitchen waste (KW). KW is homogenized and ground with a conventional grinder (available at various scales, depending on the size of the installation). After pretreatment with sieve of a mesh size of 0.5 mm, the KW is stored in a previous tank, being driven with a suitably dimensioned pump according to characteristics of the installation at regular intervals.

The plant used in the experimental part is characterized by comprising the following zones: sieving, homogenization or equalization, anaerobic reactor, membrane tank or chamber, cleaning tank, methane recovery.

The plant comprises (FIG. 3): an anaerobic reactor (1), membrane tanks (2), CIP tank (clean-in-place) (3), rotary screen (4), grinder (7). And in the same FIG. 3 the dashed lines represent biogas flows, the dotted lines represent permeate streams, the solid lines of lesser thickness represent the inputs of both wastewater and BOW and the thick solid line represents the anaerobic sludge.

The plant further comprises valves (ball valves, 3-way valves, sampling valves, diaphragm valves, adjustable and non-return valves), actuators, gas pipes, mud pipes and water pipes, supply pumps (sludge recirculation, permeate extraction), feed, blowers, purge means, biogas diffusers, on-line measurement instrumentation, sensors (pH, redox potential, conductivity, solids, turbidity, flow meters, pressure sensors, biogas composition analyzer), control system, co-generation engine and degassing membranes.

The plant receives wastewater previously sieved with a rotary filter, preferably of 0.5 mm pitch and it passes to a homogenization tank, likewise KW is sieved by a rotary filter of the same characteristics and passes to another tank. The process feed system regulates a 3-way valve which connects both the water tank and the KW tank with the reactor to determine at all times wether wastewater is entered or organic waste are entered.

The amount of BOW, which in this case is biodegradable organic waste, which can be added, is expressed by the percentage of waste compared to the total volumetric organic load (provided by the mixture of wastewater and the organic solid waste). Based on this parameter the BOW flow to be introduced into the anaerobic reactor is therefore set. The present invention allows to work with percentage values of urban solid waste from 0 to 100.

Given the estimated production values of UWW (urban wastewater) and KW per day and inhabitant, about half of the volumetric organic load is provided in the form of KW. Thus, 15.8 ml of KW per liter of wastewater from households can be used.

Preferably organic solid waste used must have a value of organic matter content, expressed as COD in the range of 45-75 g COD/L, with a particle size after the sieving (0.5 mm) such that 90% of the KW reach the anaerobic reactor.

A characterization study of kitchen waste determined the $DQO/S-SO_4$ ratio, being the average value obtained from 154.62 (61570 mg COD/398.21 mg $S-SO_4$). In the anaerobic treatment process, there is a competition for organic matter between sulfate-reducing bacteria (SRB) and methanogenic archaea (MA) when both are present in the medium. Thus, the organic matter SRB use in sulfate reduction (2 grams COD per gram of $SO_4-S$), will not be available for MA. Thanks to the addition of the KW in the process, the new relationship is well above the COD consumption ratio for the reduction of the sulfate present in the wastewater. Thus there is sufficient COD for the growth of both populations, so the larger this relationship is the greater the increase in biogas production rate will be, due to the strengthening of the methanogenic activity.

For the experimental study, proofs of water treatment during different time periods (see Table 1) were carried out. In all these periods it has been operated at a temperature of about 27° C. and sludge retention time of 70 days. Each of these periods is distinguished by the amount of KW introduced into the system: a KW % of about 25% in period 1, approximately KW % of 50% in period 2 and no addition of KW in period 3.

Table 1 shows that the methane enriched biogas production is increased up to 160% with respect to anaerobic treatment of low load wastewater, being theoretically possible to increase this amount. In this process the apparent hydrolysis constant ($K_{H,Ap}$) has been defined to show that the increase in the KW percentage introduced increases the methane production in the system, because the proportion of the most biodegradable substrate is increased, what is equivalent to increasing the substrate hydrolysis constant in the system.

TABLE 1

Experimental results of the process of including the biodegradable organic waste.

| SRT d | TRH d | T °C | $[OLR]_{UWW}$ | $[OLR]_{OSW}$ kg COD · d$^{-1}$ · m$^{-3}$ | $[VCO]_{TOTAL}$ | % OSW % | $K_{H,Ap}$ d$^{-1}$ | Biogas production L CH$_4$ · kg$^{-1}$ COD$_{inf}$ |
|---|---|---|---|---|---|---|---|---|
| 70 | 0.99 | 27.5 | 0.563 | 0.000 | 0.563 | 0.0% | 0.0091 | 89.3 |
| 72 | 0.93 | 26.7 | 0.623 | 0.201 | 0.824 | 24.9% | 0.0153 | 110.7 |
| 70 | 0.99 | 26.8 | 0.528 | 0.416 | 0.907 | 47.3% | 0.0261 | 144.0 |

Equation 1 shows the relationship between the apparent hydrolysis constant and the KW percentage.

$$K_{H,Ap} = 0.0358 * KW(\%) + 0.0082$$

wherein $K_{H\ AP}$ apparent hydrolysis constant and "KW (%)" is the percentage of the volumetric organic load corresponding to the kitchen waste.

The invention claimed is:

1. An anaerobic process with filtration procedure for wastewater treatment at room temperature, that comprises:
   continuously feeding a reactor, wherein the reactor is an anaerobic reactor that is not heated, with previously sieved wastewater and feeding in a controlled dosage biodegradable organic waste—BOW—also previously sieved, said reactor being coupled to at least one gasified filtration membrane, with recirculation of biogas from the reactor,
   carrying out in the reactor an anaerobic digestion of the organic fraction contained in the mixture of wastewater and the BOW, obtaining a treated mixture, and
   filtering the treated mixture, in at least one filtration tank through the gasified filtration membrane under conditions such that the relationship between the recirculated biogas flow rate applied per square meter of membrane and flow rate of filtered wastewater per square meter of membrane—$SGD_p$—is maintained at a minimum value in real time without interrupting the operation of the reactor by dynamically setting, depending on a rate of membrane fouling, the gas flow used to maintain the filtration membrane and the production of the treated effluent, and
   automatically controlling the following parameters: organic loading rate from the BOW in the reactor; a methane biochemical potential of the BOW; a variation of pressure inside and outside the membrane; and a total solid concentration in the reactor.

2. The process according to claim 1, wherein the biodegradable organic waste—BOW—, sieved, is introduced into the reactor with a maximum loading rate of BOW of 200% with respect to the organic loading rate of the treated wastewater.

3. The process according to claim 1, wherein there is a solid concentration $TSML_{ar}$ comprised between 1 and 35 g/L inside the reactor.

4. The process according to claim 1, wherein the $SGD_p$ has a value such that the variation of pressure inside and outside the membrane does not exceed a value of 0.05 bar·min$^{-1}$ over two consecutive cycles of filtration by the filtration membrane.

5. The process according to claim 1, wherein the biodegradable organic waste is urban waste, previously ground and sieved up to a particle size lower than 2 mm.

6. The process according to claim 1, wherein a solid recirculation is carried out between the filtration tank and the reactor with a solid recirculation ratio between the filtration tank and the reactor of a maximum value of 6.

7. The process according to claim 1, wherein the filtration step of the water treated in the reactor comprises four steps: filtration, relaxation, counterwashing and ventilation.

8. The process according to claim 7, wherein the counterwashing and ventilation steps occupy a daily average time which is at most 2% of the total time of daily operation of the plant.

9. The process according to claim 1, which further comprises performing a solid purge.

10. The process according to claim 9, that further comprises performing a solid purge, the solid purge flow (L/d) depends on the specific concentration of solids to be maintained in the reactor and carrying out an external washing of the membrane by physicochemical means when necessary according to the permeability conditions.

11. The process according to claim 10, wherein the specific concentration of solids to be maintained in the reactor is between 9 and 25 g/L.

12. The process according to claim 1, wherein the wastewater treated comprises a dissolved methane fraction that is recovered and returned to the reactor by a degassing cone or membrane.

13. The process according to claim 1, wherein the wastewater is urban wastewater.

14. The process according to claim 1, wherein the biodegradable solid waste is domestic organic waste.

15. The process according to claim 1, wherein:
   the biodegradable organic waste—BOW—is added to the reactor, with a maximum loading rate of BOW of 200% with respect to a wastewater loading rate,
   the reactor has a solid concentration, $TSML_{ar}$ comprised between 1 and 35 g/L, and
   a ratio of solid recirculation between the reactor and a chamber comprising the membrane, with regard to the reactor feeding flow is less than 6.

16. A wastewater treatment plant for carrying out the process described in claim 1, comprising:
   a wastewater stream connected to a sieving zone (4) further connected to a wastewater equalization tank (5),
   a biodegradable organic waste (BOW) stream connected to a sieving zone (4) further connected to a BOW tank (6), the reactor,
both tanks (5, 6) being connected to the reactor (1) through a three way valve,
at least one membrane tank (2) connected to the reactor (1),
methane recovery unit from permeate (3), and
a dynamical control system controlling in real time the parameters of the plant including the $SGD_p$.

17. The plant according to claim 16, wherein the membrane or membranes are submerged and located in at least a second tank coupled to the reactor.

\* \* \* \* \*